_United States Patent_ [19]

Asaeda

[11] Patent Number: 4,906,860
[45] Date of Patent: Mar. 6, 1990

[54] CONTROL DEVICE FOR ACTIVE FILTER

[75] Inventor: Takeaki Asaeda, Kobe, Japan

[73] Assignee: Mitsubishi Denki Kabushiki Kaisha, Japan

[21] Appl. No.: 347,874

[22] Filed: May 5, 1989

[51] Int. Cl.$^4$ .............................................. H02M 1/12
[52] U.S. Cl. ........................................ 307/105; 307/3; 323/217; 363/41
[58] Field of Search ................... 307/3, 105; 323/207, 323/217; 363/41

[56]  References Cited
U.S. PATENT DOCUMENTS

| | | | |
|---|---|---|---|
| 3,531,652 | 9/1970 | Aemmer et al. | 307/105 |
| 3,628,057 | 12/1971 | Mueller | 307/105 |
| 4,053,820 | 10/1977 | Peterson et al. | 307/3 |
| 4,647,837 | 3/1987 | Stemmler | 363/41 |
| 4,757,415 | 7/1988 | Smith et al. | 307/3 |
| 4,812,669 | 3/1989 | Takeda et al. | 323/207 |
| 4,835,411 | 5/1989 | Takeda et al. | 307/105 |

_Primary Examiner_—Patrick R. Salce
_Assistant Examiner_—Jeffrey Sterrett
_Attorney, Agent, or Firm_—Leydig, Voit & Mayer

[57] ABSTRACT

A control device for an active filter according to the present invention comprises a ROM circuit for producing output signals sin $\theta$ and cos $\theta$ from a phase signal generated from a PLL circuit, a first multiplier for multiplying a load current detection signal by the output signals sin $\theta$ and cos $\theta$, a sample-holding circuit for integrating the output signal of the first multiplier and holding the integrated value to produce peak values of valid current component and invalid current component for constituting the basic wave component of the load current, a second multiplier for multiplying the peak values by the output signals sin $\theta$ and cos $\theta$, and a PWM control circuit for PWM-controlling the input current of the active filter with a harmonic current signal obtained as the difference between a basic wave current signal of the load current during a period of next one period of the single-phase a.c. power source and the load current detection signal by utlizing as the basic wave current signal of the load current of the period of next one period of the single-phase a.c. power source the basic wave current signal obtained by combining the valid current component and the invalid current component of the basic wave component outputted from the second multiplier.

3 Claims, 5 Drawing Sheets

FIG. 5 PRIOR ART
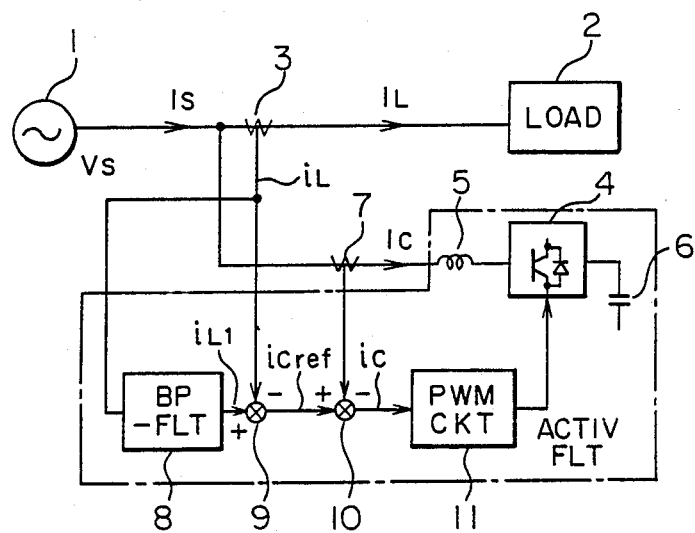
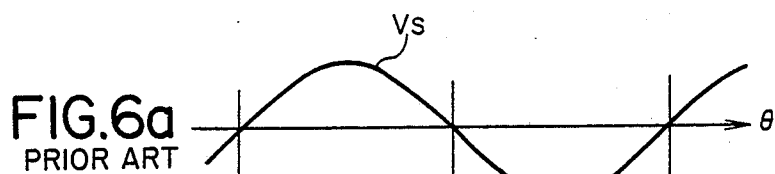
FIG.6a
PRIOR ART
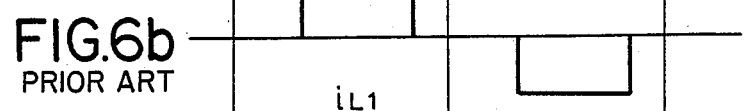
FIG.6b
PRIOR ART
FIG.6c
PRIOR ART
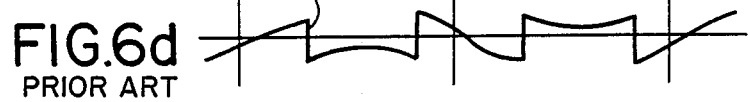
FIG.6d
PRIOR ART

CONTROL DEVICE FOR ACTIVE FILTER

BACKGROUND OF THE INVENTION

The present invention relates to a control device for an active filter (active type filter) for absorbing a harmonic current generated from a load connected to an a.c. power source to remove the harmonic current flowing out from the a.c. power source.

FIG. 5 is a circuit diagram showing a prior art control device for an active filter disclosed, for example, on page 69 of a lecture and thesis series (Vol. 1) of a general conference of The Electric and Information Society in 1985. In the figure, reference numeral 1 denotes an a.c. power source, numeral 2 denotes a load connected to the a.c. power source 1 for generating a harmonic current, numeral 3 denotes a load current detector for detecting the load current $I_L$ of the load 2, and numeral 4 denotes an inverter connected to the a.c. power source 1 through a reactor 5 and also connected at its d.c. output side to a capacitor 6.

Numeral 7 denotes an a.c. current detector for detecting the a.c. current Ic of the inverter 4, and numeral 8 denotes a bandpass filter for removing a harmonic component from the output signal $i_L$ of the load current detector 3 to produce a basic wave component $i_{L1}$.

Numeral 9 denotes a first adder which produces a harmonic component $i_{cref}$ of the difference between the output signal $i_{L1}$ of the bandpass filter 8 and the output signal $i_L$ of the load current detector 3.

Numeral 10 denotes a second adder which produces the difference between the output signal $i_{cref}$ of the first adder 9 and the output signal $i_c$ of the a.c. current detector 7 of the inverter 4. Numeral 11 denotes a PWM circuit which pulse-width-modulation controls a switching element of the arm element of the inverter 4 in accordance with the output signal of the second adder 10.

The operation of the control device for the active filter constructed as described above will be described with reference to the signal waveform diagram shown in FIG. 6. A current of rectangular wave is assumed here as the current $I_L$ ($i_L$) of the load 2, and this basic wave component $i_{L1}$ is produced by the bandpass filter 9 which so operates as to produce only a basic wave component.

The harmonic component $i_{cref}$ of the load 2 is obtained by the calculation of $i_{L1}' - i_L$ as shown in FIG. 6(d). With the harmonic component $i_{cref}$ as a current reference the a.c. side current Ic of the inverter 4 is controlled to be momentarily traced by the PWM circuit 11 to feed the harmonic component generated from the load 2 to the inverter 4. As a result, only the basic wave current component similar to the basic wave component $i_{L1}$ flows as as the a.c. current Is of the a.c. power source 1.

In case of 3-phase a.c. power sources, a 3-phase/3-phase converter is provided at the input unit of the bandpass filter 8 as shown by an equation (1), the component of the load current is separated to a valid power component $i_p$ and an invalid power component $i_q$, the bandpass filter 8 is replaced with a low-pass filter, and it is general to employ a system for producing only the d.c. component.

$$\begin{bmatrix} i_p \\ i_q \end{bmatrix} = \sqrt{\frac{2}{3}} \begin{bmatrix} \sin\theta & \sin(\theta - 2\pi/3) & \sin(0 + 2\pi/3) \\ \cos\theta & \cos(\theta - 2\pi/3) & \cos(\theta + 2\pi/3) \end{bmatrix} \begin{bmatrix} i_{LR} \\ i_{LS} \\ i_{LT} \end{bmatrix} \quad (1)$$

This is because when the basic wave component of the load current is converted by the conversion matrix of the equation (1) into a 2-phase, both the valid current component ip and the invalid current component iq become d.c. component. As a consequence, when the d.c. signal produced by the low-pass filter is 2-phase/3-phase converted by a reverse conversion matrix of the equation (1), 3-phase basic wave components are obtained.

However, when the conversion matrix is applied to a single-phase a.c. power source, if $i_{LR} = i_{LS}$ and $i_{LT} = 0$ are, for example, satisfied, the basic component of a load current is formed by superposing an a.c. component having a frequency as large as twice of the frequency of the power source on a d.c. component, and it becomes very difficult to design the low-pass filter.

Since the prior art control device for the active filter is constituted as described above, when it is applied to a single-phase a.c. power source, if the degree of harmonic component is near that of a basic wave component, it is very difficult to design the bandpass filter 8. There are problems that the output signal $i_{L1}$ of the bandpass filter 8 is displaced in its phase from the basic wave current of the actual load current, the amplitude of the signal is varied, or the frequency of the power source is altered, etc. Further, when a 3-phase/2-phase conversion matrix is similarly applied, it is very difficult as described above to design a low-pass filter after the 3-phase/2-phase conversion is conducted, and there is a problem that an error of the actual load current from the basic wave current is increased, etc.

SUMMARY OF THE INVENTION

The present invention has been made to solve the above-described problems, and has for its object to provide a control device for a single-phase active filter which can accurately detect and remove the basic wave component of a load current.

The control device for the active filter according to the present invention comprises a ROM circuit for producing output signals $\sin\theta$ and $\cos\theta$ from a phase signal generated from a PLL circuit, a first multiplier for multiplying a load current detection signal by the output signals $\sin\theta$ and $\cos\theta$, a sample-holding circuit for integrating the output signal of the first multiplier and holding the integrated value to produce peak values of valid current component and invalid current component for constituting the basic wave component of the load current, a second multiplier for multiplying the peak values by the output signals $\sin\theta$ and $\cos\theta$, and a PWM control circuit for PWM-controlling the input current of the active filter with a harmonic current signal obtained as the difference between a basic wave current signal of the load current during a period of next one period of the single-phase a.c. power source and the load current detection signal by utilizing as the basic wave current signal of the load current of the period of next one period of the single-phase a.c. power source the basic wave current signal obtained by combining the valid current component and the invalid current component of the basic wave component outputted from the second multiplier.

The control device for the active filter according to the present invention obtains the peak values of the valid current component and the invalid current component of the basic wave component at each period of one period of the single-phase a.c. power source, obtains the basic wave component from the peak values, utilizes it as the basic wave current of the period of next one period, and controls the input current of the active filter with the harmonic current signal obtained as the difference between the basic wave current signal and the load current detection signal as a reference signal to accurately absorb the harmonic component of the load by the active filter, thereby removing the harmonic component flowing to the single-phase a.c. power source.

BRIEF DESCRIPTION OF THE DRAWINGS

FIG. 5 is a circuit diagram showing a prior art control device for an active filter; and FIG. 6 is a signal waveform diagram for explaining the operation of FIG. 5.

In the drawings, the same symbols indicate the same or corresponding parts.

DESCRIPTION OF THE PREFERRED EMBODIMENTS

Figure 1:
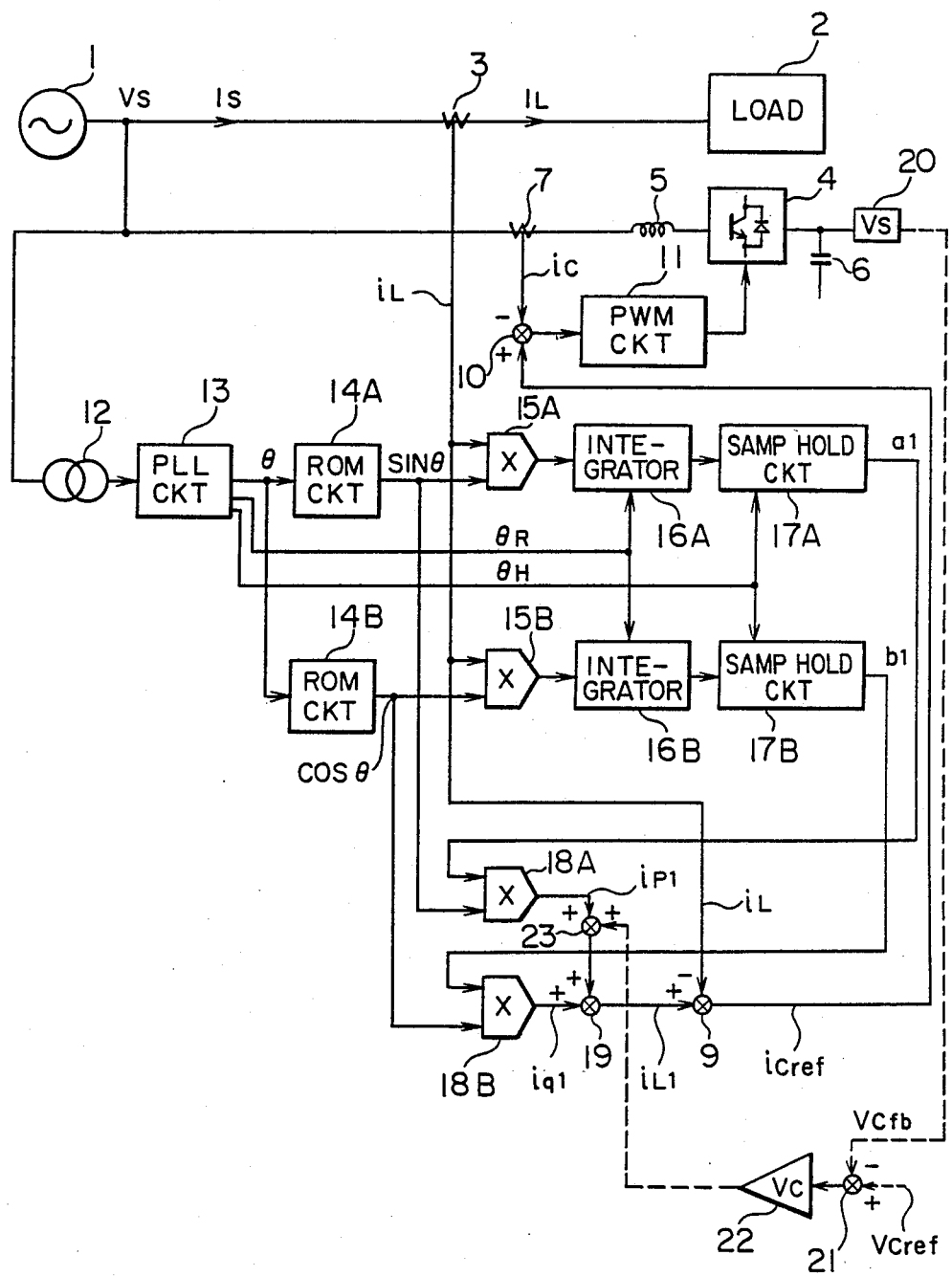
FIG. 1 is a circuit diagram showing a control device for an active filter according to an embodiment of the present invention.

An embodiment of the present invention will be described below in conjunction with FIG. 1, wherein the same symbols as those in FIG. 5 denote the same or corresponding parts. In FIG. 1, reference numeral 12 denotes a voltage detector for detecting the voltage of an a.c. power source 1, numeral 13 denotes a PLL circuit connected to the output side of the voltage detector 12 for generating phase signals $\theta_I$, $\theta_R$ and $\theta_H$ synchronized with the a.c. power source 1, symbols 14A and 14B denote ROM circuits for converting the phase signal $\theta$ of one of the outputs of the PLL circuit 13 into $\sin \theta$ and $\cos \theta$, symbols 15A and 15B denote first multipliers for multiplying the output signals $\sin \theta$ and $\cos \theta$ of the ROM circuits 14A and 14B by the detection signal $i_L$ of the load current $I_L$ of a load 2, symbols 16A and 16B denote integrators for integrating the output signals of the first multipliers 15A and 15B until a reset signal $\theta_R$ of one of the outputs of the PLL circuit is generated, symbols 17A and 17B denote sample-holding circuit for holding the output signals of the integrators 16A and 16B each time a holding signal $\theta_H$ of one of the outputs of the PLL circuit is generated, symbols 18A and 18B denote second multipliers for multiplying the basic wave components $a_1$ and $b_1$ of the outputs of the sample-holding circuits 17A and 17B by the output signals $\sin \theta$ and $\cos \theta$ of the ROM circuits 14A and 14B, and numeral 19 denotes a third adder for adding the output signals $i_p$ and $i_q$ of the second multipliers to produce a basic wave current signal $i_{L1}$.

Figure 2:
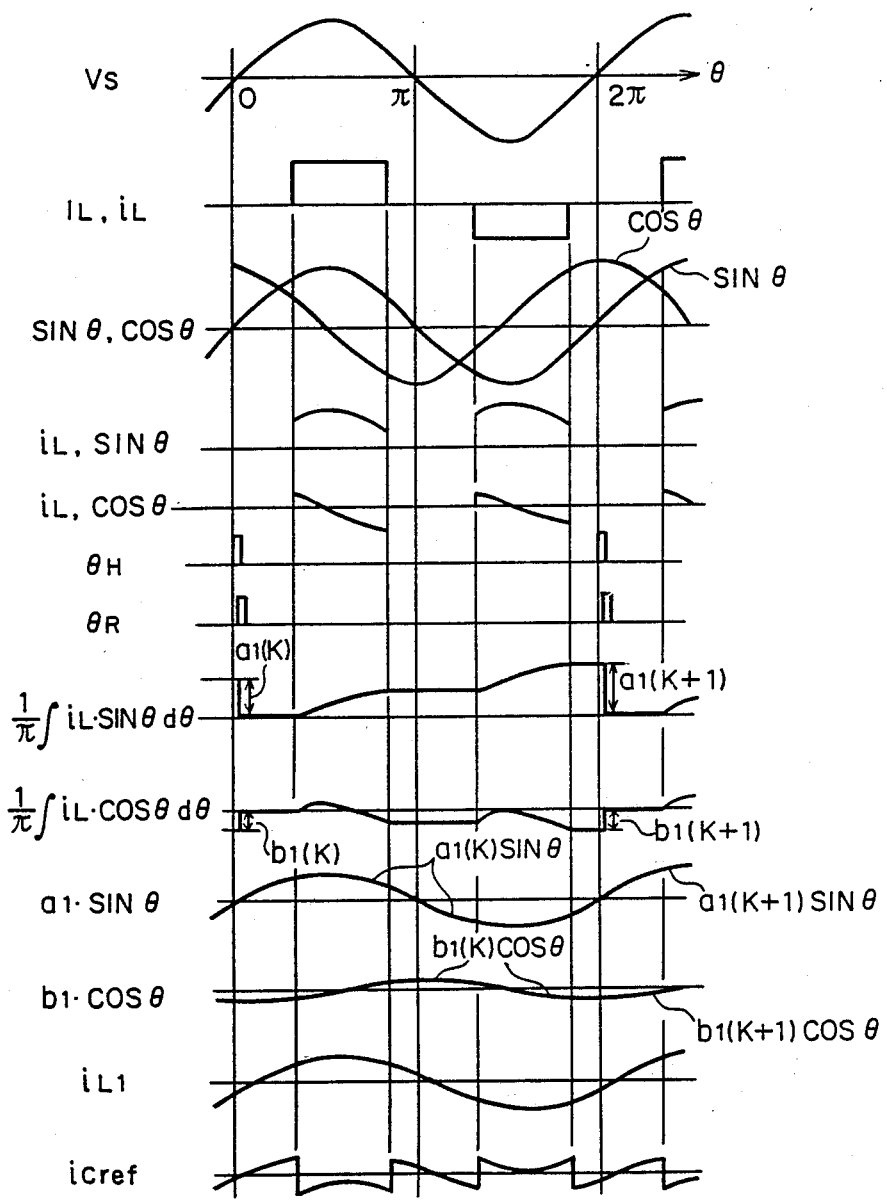
FIG. 2 is a signal waveform diagram for explaining the operation of FIG. 1.

The operation of the control device for the active filter constructed as described above will be described with reference to the signal waveform diagram of the sections of FIG. 1 shown in FIG. 2. The load current $I_L$ of the load 2 is exemplified with respect to the case of a rectangular current. It is known that the detection signal $i_L$ of the load current $I_L$ can be developed by a Fourier series as the following equation.

$$i_L = b_0 + \sum_{n=1}^{\infty} b_n \cos n\theta + \sum_{n=1}^{\infty} a_n \sin n\theta \qquad (2)$$

where the $b_0$ denotes a d.c. component, and the $b_n$ and $a_n$ denote the peak values of an n-th harmonic component.

It is also known that the basic wave components $a_1$ and $b_1$ are obtained by the following equations:

$$a_1 = \frac{1}{\pi} \int_0^{2X} i_L \sin \theta \, d\theta \qquad (3)$$

$$b_1 = \frac{1}{\pi} \int_0^{2X} i_L \cos \theta \, d\theta \qquad (4)$$

The PLL circuit 13 detects the phase signal $\theta$ ($0-2\pi$) of the voltage Vs of the a.c. power source 1, and the ROM circuits 14A and 14B respectively generate output signals $\sin \theta$ and $\cos \theta$ according to the phase signal $\theta$.

The output signals of the first multipliers 15A and 15B respectively become $i_L \sin \theta$ and $i_L \cos \theta$ to obtain the waveforms as shown. The integrators 16A and 16B perform the integrations of the above equations (3) and (4), integrate until the reset signal $\theta_R$ outputted from the PLL circuit 13 at every one period of the a.c. power source 1 is given, are reset to set the outputs to zero when the reset signal $\theta_R$ is applied in the vicinity of the phases "0" and "$2\pi$".

When the PLL circuit 13 outputs the holding signal $\theta_H$ to the sample-holding circuits 17A and 17B immediately before the reset signal $\theta_R$ is generated, the sample-holding circuits 17A and 17B respectively hold the output signals of the integrators 16A and 16B, and respectively hold the basic wave components $a_1$ and $b_1$ of the equations (3) and (4) during one period in which the holding signal $\theta_H$ is next applied.

For example, if the basic wave components $a_1 = a_1(k)$ and $b_1 = b_1(k)$ are satisfied at the time of the phase signal $\theta = 0$, the sample-holding circuits 17A and 17B hold the values during the period of $\theta = 0-2\pi$, and if the basic wave components $a_1 = a_1(k+1)$ and $b_1 = b_1(k+1)$ are satisfied at the time of the phase signal $\theta = 2\pi$, the sample-holding circuits 17A and 17B hold the values during the period of $\theta = 2\pi-4\pi$.

The second multipliers 18A and 18B respectively multiply the basic wave components $a_1$ and $b_1$ of the outputs of the sample-holding circuits 17A and 17B by the output signals $\sin \theta$ and $\cos \theta$ of the ROM circuits 14A and 14B, and output the valid current component $i_{p1}$ and the invalid current component $i_{q1}$ of the basic wave component according to the equation (2), where the valid current component $i_{p1}$ and the invalid current component $i_{q1}$ are given by the following equation.

$$i_{p1} = a_1 \sin \theta, \quad i_{q1} = b_1 \cos \theta \qquad (5)$$

The third adder 19 add the valid current component $i_{p1}$ and the invalid current component $i_{q1}$ according to the equation (2) to produce the basic wave component $i_{L1}$ of the load current.

$$i_{L1} = i_{p1} + i_{q1} = a_1 \sin \theta + b_1 \cos \theta \qquad (6)$$

Here, since the basic wave component obtained in this manner depends upon the $a_1$ and $b_1$ of the outputs of the sample-holding circuits 17A and 17B at the time before one period, a deviation is strictly generated from the actual value if the basic wave component of the actual load current is abruptly varied in next period.

As a remedy for this case, a control system designated by a broken line in FIG. 1 is added. In the case that the inverter 4 is of a voltage type inverter, a capacitor 6 which becomes a voltage source is connected to the d.c. output side, the voltage of this capacitor 6 is detected by a voltage detector 20 to control the valid current component so that the voltage detection signal $V_{cfb}$ coincides with the voltage reference signal $v_{cref}$. The difference between the voltage reference signal $v_{cref}$ and the voltage detection signal $v_{cfb}$ is produced by an adder 21, the difference signal is amplified by a voltage controller 22, and added to the valid current component $i_{pL}$ of the output of the second multiplier 18A by an adder 23.

If the valid current component of the basic wave component of the load current $I_L$ is different from the calculated value, it is presented as the voltage change of the capacitor 6. Thus, it can be compensated by correcting the valid current component $i_{p1}$ by the voltage controller 22.

The valid current component $i_{p1}$ of the basic wave component of the load current can be compensated by the above remedy, but the invalid current component $i_{p1}$ cannot be compensated. Therefore, the integrator 16B and the sample-holding circuit 17B for producing the basic wave component $b_1$ are multiplexed in a time division manner to equivalently shorten the sampling period, thereby corresponding to the abrupt change of the load current $I_L$.

Figure 3:
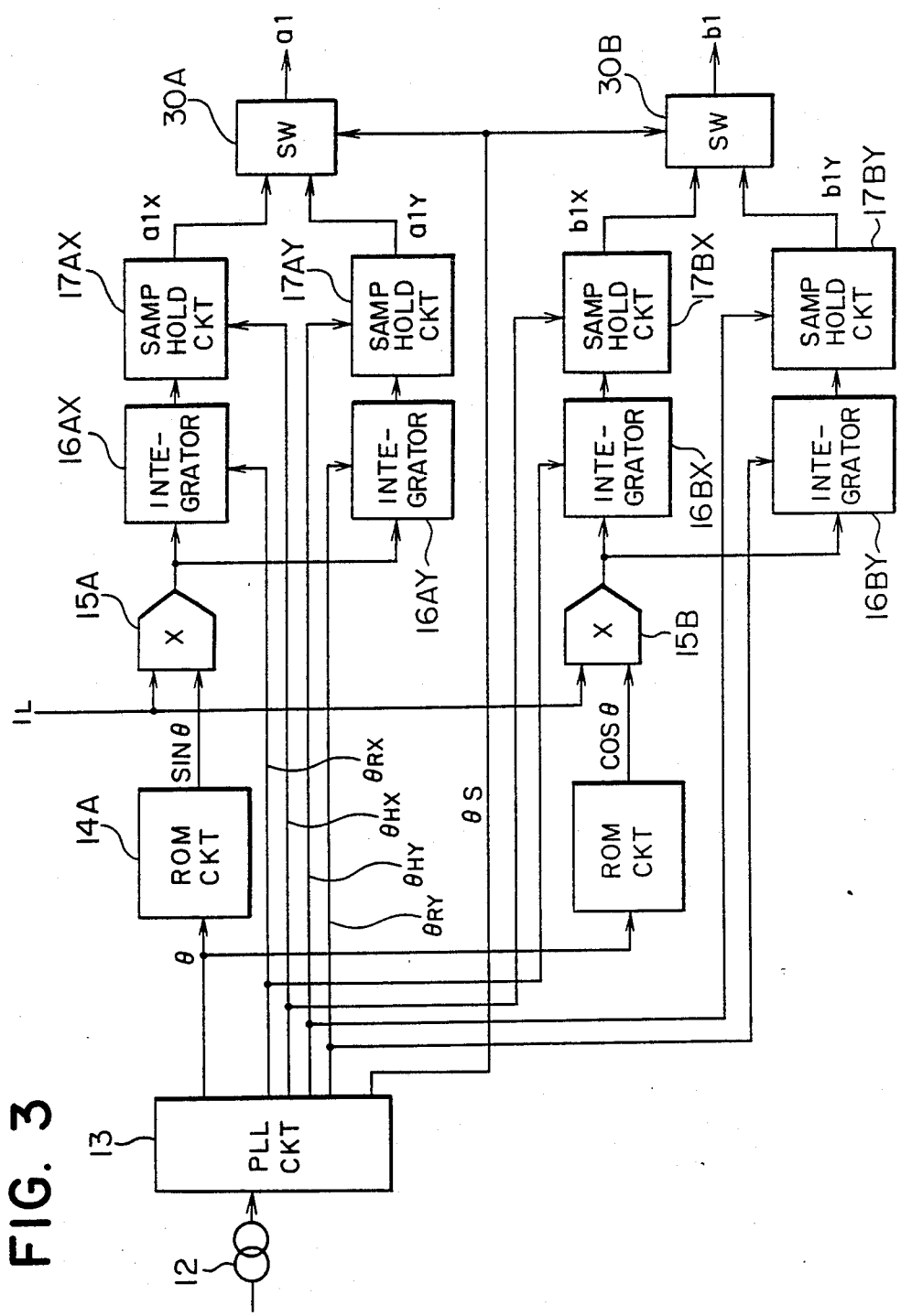
FIG. 3 is a circuit diagram showing another embodiment of the present invention.

FIG. 3 shows an embodiment of the time division multiplexer, in which both an integrator 16 and sample-holding circuit 17 are multiplexed in a time division manner for both the valid current component and the invalid current component.

Integrators 16AX and 16AY and integrators 16BX and 16BY, and sample-holding circuits 17AX and 17AY and sample-holding circuits 17BX and 17BY are provided at the output sides of the first multipliers 15A and 15B, switch circuits SOA and SOB FOR switching the output signals of the sample-holding circuits 17AX, 17AY and 17BX, 17BY are further provided to produce the peak values of the valid current component $i_{p1}$ and the invalid current component $i_{q1}$ for constituting the basic wave component of the load current.

The operation of the time division multiplexer will be described by referring to the signal waveform diagram of FIG. 4. The holding signals $\theta_{HX}$ and $\theta_{HY}$ of the sample-holding circuits 17AX, 17BX and 17AY, 17BY are given by the PLL circuit 13 at each one period in the phase difference of 180° as shown, and the output signals of the integrators 16AX, 16BX, 16AY, 16BY are sample-held.

The reset signals $\theta_{RX}$ and $\theta_{RY}$ of the integrators 16AX, 16BX and 16AY, 16BY are given by the PLL circuit 13 immediately after the holding signals $\theta_{HX}$ and $\theta_{HY}$ are generated to reset the integrates 16AX, 16BX, 16AY, 16BY.

A switching signal $\theta s$ to the switch circuits 30A and 30B is of a signal which becomes "H" or "L" immediately after the holding signals $\theta_{HX}$ and $\theta_{HY}$ are generated, i.e., at each half period, and is given by the PLL circuit 13. When the switching signal $\theta s$ is the "H" level, the output signals $a_{1X}$ and $b_{1X}$ of the sample-holding circuits 17AX and 17BX are selected to produce the basic wave components $a_1$ and $b_1$, and when the switching signal $\theta s$ is the "L" level, the output signals $a_{1Y}$ and $b_{1Y}$ of the sample-holding circuits 17AY and 17BY are selected to produce the basic wave components $a_1$ and $b_1$.

For example, the output signals $a_1(k)$ and $b_1(k)$ of the sample-holding circuits 17AX and 17BX become the basic wave components $a_1$ and $b_1$ immediately after the phase signal $\theta = 0$, and the output signal $a_1(k+1)$ and $b_1(k+1)$ of the sample-holding circuits 17AY and 17BY become the basic wave components $a_1$ and $b_1$ immediately after the phase signal $\theta = \pi$.

Figure 4:
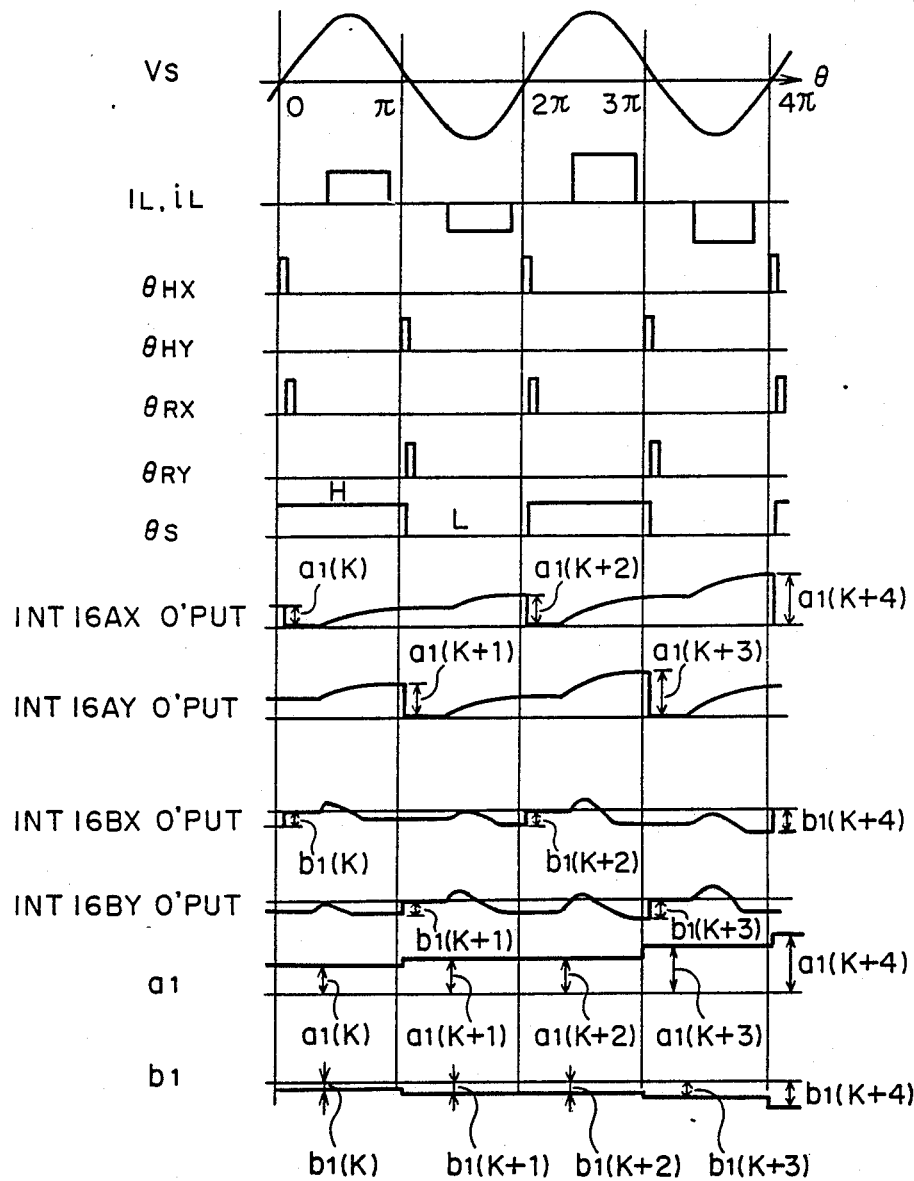
FIG. 4 is a signal waveform diagram for explaining the operation of FIG. 3.

FIG. 4 shows the case that the load current abruptly increases after the phase signal $\theta = 2\pi$, and the basic wave components $a_1$ and $b_1$ substantially follow up the load current at the delay of half period.

In the embodiment in FIG. 3, the case that the integrator 16 and the sample-holding circuit 17 are duplicated is shown. However, the present invention is not limited to the particular embodiment. The integrator 16 and the sample-holding circuit 17 may be further added to be multiplexed. For example, in case of quadrupling, four sets of the integrators 16 and the sample-holding circuits 17 are provided for the valid current component and the invalid current component, the holding signals $\theta_H$ and the reset signal $\theta_R$ are generated at each one period, the interval of the holding signal $\theta_H$ and the reset signal $\theta_R$ is set to $\pi/2$, and the switching period of the switch 30 is set to $\pi/2$, thereby performing the quadrupling. Thus, the followability to the abrupt change of the load current $I_L$ is improved.

In the embodiments described above, the concrete hardware (H/W) of the control device is composed mainly of analog circuits. However, the present invention is not limited to the particular embodiments. For example, the control device of the invention may be composed of digital circuits, such as microcomputers.

In the embodiments described above, the inverter 4 is composed of the voltage type inverter, and the inverter in which the capacitor 6 is connected to its d.c. output side is exemplified. However, the present invention is not limited to the particular embodiment. For example, the inverter 4 may be formed of a current type inverter, and a reactor may be connected to the d.c. output side. In this case, in order to maintain the current of the reactor constant, a deviation from the current reference is amplified and may be applied to the valid current component $i_{p1}$ of the basic wave component. Further, a plurality of the inverter 4 may be provided in multiplex.

The detail of the PWM circuit 11 is omitted. However, it may be composed of a triangular wave carrier comparison system or a hysteresis comparator system as known, and it is preferable that the responsiveness of controlling the current is high.

According to the present invention as described above, the peak values of the valid current component and the invalid current component of the basic wave component of the load current are obtained by the integrators for integrating during one period and the sample-holding circuits for sample-holding the outputs of the integrators each time the integration of the integrator is completed, the basic wave component is obtained by the peak values to be utilized as the basic wave current signal of next one period, and the harmonic current signal obtained by the difference between the basic wave current signal and the load current detection signal is used as the reference signal to accurately absorb the harmonic component of the load by the active filter, thereby providing the effect of removing the harmonic component flowing to the single-phase a.c., power source.

What is claimed is:

1. A control device for an active filter connected in parallel with a load connected to a single-phase a.c. power source for operating to absorb a harmonic current component of said load comprising:
   a PLL circuit for generating a phase signal synchronized with said single-phase a.c. power source;
   a ROM circuit inputting said phase signal for producing output signals sin $\theta$ and cos $\theta$;
   a first multiplier for multiplying a load current detection signal of said load by the output signals sin $\theta$ and cos $\theta$;
   an integrator for integrating the output signal of said first multiplier at each one period of said single-phase a.c. power source;
   a sample-holding circuit for holding the integrated final value of said integrator to produce peak values of valid current component and invalid current component for constituting the basic wave component of the load current,
   a second multiplier for multiplying the peak values by the output signals sin $\theta$ and cos $\theta$, and
   a PWM control circuit for PWM-controlling the input current of said active filter with a harmonic current signal obtained as the difference between a basic wave current signal of the load current during a period of next one period of said single-phase a.c. power source and the load current detection signal by utilizing as the basic wave current signal of the load current of the period of next one period of said single-phase a.c. power source the basic wave current signal obtained by combining the valid current component and the invalid current component of the basic wave component outputted from said second multiplier.

2. The control device for an active filter according to claim 1, wherein, when said active filter is constituted of a voltage type inverter, its output voltage is compared with the reference signal of said output voltage, while when said active filter is constituted of a current type inverter, its output current is compared with a reference signal of said output current, and the difference is amplified, and added to the valid current component.

3. The control device for an active filter according to claim 1, wherein a plurality of sets of integrators and sample-holding circuits are constituted in a time division multiplexer, and operated in a time division manner, the output signals of said sets of sample-holding circuits are selected synchronously with the time division timing signal to obtain the peak values of the valid current component and the invalid current component for constituting the basic wave component of the load current.

* * * * *